United States Patent
Karlsson

(10) Patent No.: US 8,386,351 B2
(45) Date of Patent: Feb. 26, 2013

(54) OPTIMIZED RESERVATION FOR MULTI-SESSION AND/OR MULTI-UNIT TYPES

(75) Inventor: Stefan Karlsson, Karlskrona (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 663 days.

(21) Appl. No.: 12/159,447

(22) PCT Filed: Dec. 28, 2006

(86) PCT No.: PCT/EP2006/012587
§ 371 (c)(1),
(2), (4) Date: Dec. 30, 2008

(87) PCT Pub. No.: WO2007/077006
PCT Pub. Date: Jul. 12, 2007

(65) Prior Publication Data
US 2009/0319412 A1     Dec. 24, 2009

(30) Foreign Application Priority Data
Dec. 30, 2005   (EP) .................................... 05028728

(51) Int. Cl.
  *G06Q 40/00* (2006.01)
(52) U.S. Cl. .............. 705/35; 705/39; 705/40; 705/412; 705/338; 370/389; 455/407; 455/67; 348/14.01; 379/114.22; 604/6.11

(58) Field of Classification Search ............... 379/93.08, 379/114.22; 370/389; 705/412, 39, 40, 338, 705/35; 455/407, 67; 348/14.01; 604/6.11
See application file for complete search history.

(56) References Cited

U.S. PATENT DOCUMENTS

| | | | |
|---|---|---|---|
| 2003/0101135 A1* | 5/2003 | Myatt et al. ...................... | 705/40 |
| 2003/0125968 A1 | 7/2003 | Uppal | |
| 2004/0077332 A1* | 4/2004 | Ephraim et al. .............. | 455/405 |
| 2004/0148263 A1 | 7/2004 | Lialiamou et al. | |

FOREIGN PATENT DOCUMENTS

| | | |
|---|---|---|
| WO | WO 98/56160 A | 12/1998 |
| WO | WO 01/86933 | 11/2001 |
| WO | WO 03/025870 A | 3/2003 |

* cited by examiner

*Primary Examiner* — Harish T. Dass

(57) ABSTRACT

To provide optimized real-time charging for simultaneous services there is provided a method and apparatus for executing a real-time charging session in a charging system being interfaced to at least one communication network. At start of a charging session or during re-authorization of reserved funds there is executed an optimized fund reservation for multi-service and/or multi-unit type services such that it is possible to optimize the fund resources considering various services and related service types in parallel. Fund reservation is executed for multi-service and/or multi-unit type services such that deviations between time of predicted fund depletion for the at least two services and/or for the at least two service types are minimized. Therefore, the signalling traffic to and from the charging system is reduced significantly.

28 Claims, 10 Drawing Sheets

OPTIMIZED RESERVATION FOR MULTI-SESSION AND/OR MULTI-UNIT TYPES

FIELD OF INVENTION

The present invention relates to the field of communication, and in particular to optimised charging for multi-session and/or multi-unit type communication.

BACKGROUND ART

Telecommunication operators today use a charging system to determine the charge to their subscribers which use their services, e.g., circuit switched voice, SMS, MMS and/or GPRS. The subscribers often have either a prepaid option or a postpaid option which they use to pay for a particular service. If a subscriber uses the postpaid option, s/he pays for a service after it has been used, e.g., once a month. If a subscriber uses the prepaid option, then s/he pays before the usage of a service. Both payment options can use real time charging also referred to as credit control, wherein the charging is executed during ongoing service delivery. The postpaid option also supports non-real time charging, wherein the charging executed after service delivery.

Therefore, during a charging session at least one calculation run based on service usage is performed by the charging system. E.g., the charging system determines the charge for a service according to the duration of the service, the time of service usage, use of a promotion campaigns etc.

As is explained in WO 2003/3032657, real time charging of service delivery relies on a reservation of funds corresponding to an invoked service in order for the invoked service to be allowed to execute. When the granted reservation of funds is used up by the service the service reports back, and its used funds are removed from an account and any excess amount of the reservation is put back on the account. If continued execution of the service is required a new reservation is made for the service.

However, in the known charging system there is no way to optimize the distribution of available funds between simultaneous services, services that are listed in one and the same request for reservation or parallel services not emanating from the same reservation request. Further there is no optimization with respect to different service types also referred to as unit types in the following, e.g., service usage time, total data volume, downlink data volume, uplink data volume, event like SMS or MMS, etc.

SUMMARY OF INVENTION

In view of the above the technical problem of the present invention is provide optimised real-time charging for simultaneous services.

According to the present invention this object is achieved by a method of executing a real-time charging session in a charging system being interfaced to at least one communication network. The method comprises a step of initiating a fund reservation with respect to at least two services and/or at least two service types used for a single service. Subsequent hereto there is executed a step to reserve funds for service delivery to the at least two services and/or for the at least two service types such that deviations between predicted fund use-up times are minimized.

An advantage of the present invention is that fund reservation may be initiated for a multi-session and/or multi-type communication such that it is possible to optimise the fund resources considering various services and related service types in parallel.

Another advantage of the present invention is a reduction in signalling traffic. As fund resources are reserved the predicted fund use-up times deviation is minimized, related feedback from charged services occurs essentially at the same time. Considering multi-session or multi-type service communication, then the feedback from involved services may be given in a single message leading to significant reduced signalling overhead.

The same advantage arises also in other cases where all service usage is always reported in one operation, the difference being that with poorly optimized charging the signaling of this one operation has to occur more frequently. It should be noted that if the control is done in different nodes several messages are needed to make the reservation optimization, i.e. one or more independent messages per node. In this case a received message would force the charging system to send a message to all other nodes controlling service usage from this account asking to immediately request the service usage so far so that deduct of service usage and a new optimized reservation may be made. In more detail, this is to settle the old reservation and remake the reservation for all involved nodes/sessions. This operation from the charging system to request back the usage is introduced, e.g., in Diameter DCC according to IETF RFC 4006.

According to a preferred embodiment of the present invention it is suggested to arrange services before fund reservation according to a prerequisite succession for service delivery. Here, the prerequisite succession defines at least one prerequisite service, if any, that needs to be provided prior to at least one higher succession invoking service, and further at least one higher succession invoking service.

Therefore, the present invention enables optimisation of fund resources when available funds do not satisfy preferred service needs, either due to a shortage of funds in view of a low account or when funds for multi-session or multi-type service communication have a cap imposed thereon. In other words, should available funds not be enough to satisfy all service needs, then higher prioritized services/service types would be awarded funds first and only then would funds be allocated to services/service types having lower priority.

According to another preferred embodiment of the present invention it is suggested to differentiate between preferred and minimum funds with respect to different services and service types.

This preferred embodiment of the present invention is of particular benefit at fund shortage, to satisfy each fund request as far as possible. In more detail, the differentiation between preferred and minimum funds allows for a splitting of funds that is still meaningful when available funds do not cover the preferred amounts for different services and service types. Also, only funds that allow to start or to continue a service and related service type(s) will be reserved which also contributes significantly to the reduction of signalling traffic.

Further preferred embodiment of the present invention are related to the splitting of funds between at least one prerequisite service, if any, and the at least one higher succession invoking service and according to related service type(s) on the basis of a pre-determined fund splitting optimisation approach when the sum of the amount of the first preferred funds and the amount of the second preferred funds is higher than an overall available fund. Here, the splitting of funds may be achieved either at the start of a charging session or during an ongoing charging session for fund re-authorization.

A first option supported by the present invention, suited to the start of a charging session, is to execute the pre-determined fund splitting optimisation using pre-registered information on the amount of preferred funds and minimum funds with respect to each involved service and related service type(s). Here it is also possible to consider a plurality of pre-known combinations of services and related service type(s).

This option may be implemented in an efficient manner either a static version where the pre-registered information remains unchanged over time or as a semi-static version where the pre-registered information may be re-configured. This supports a trade off between ease of implementation versus flexibility.

A second option supported by the present invention is to execute the pre-determined fund splitting optimisation with respect to a pre-known combination of services and related service type(s). Here, it is possible to use a splitting mechanism integrated into a rating service activated by the charging system.

The second option is of advantage when the rating of services is differentiated, i.e. when the services are not combined in logic. According to the present invention it is suggested to run the rating of service combinations in parallel in substitution for a sequential rating of these services which leads to again to advantages when an available amount of funds do not satisfy all fund requirements of different services.

A third option supported by the present invention is to execute the pre-determined fund splitting optimisation in an adaptive manner on the basis of historical use data reflecting prior usage with respect to each involved service and related service type(s). This option may also be applied to a service combination or a plurality of service combinations.

The third option is of particular benefit when characteristics of service usage change over time. Further, the present invention overcomes the restricted viewpoint that when all services and service types get their preferred funds reserved, then no more optimization would be necessary. To the contrary, considering a plurality of services and/or a plurality of service combinations avoids a situation where one reservation request blocks other fund requests by triggering a reservation of all funds available on an account.

According to another preferred embodiment of the present invention there is provided a computer program product directly loadable into the internal memory of a charging apparatus comprising software code portions for performing the inventive charging process when the product is run on a processor of the charging apparatus.

Therefore, the present invention is also provided to achieve an implementation of the inventive method steps on computer or processor systems. In conclusion, such implementation leads to the provision of computer program products for use with a computer system or more specifically a processor comprised in, e.g., a charging apparatus.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard drives; or information convey to a computer/processor through communication media such as network and/or Internet and/or telephone networks via modems or other interface devices. It should be understood that such media, when carrying processor readable instructions implementing the inventive concept represent alternate embodiments of the present invention.

DESCRIPTION OF DRAWING

In the following there will be described the best mode as well as preferred embodiments of the invention with reference to the drawing in which.

DESCRIPTION OF BEST MODE AND PREFERRED EMBODIMENTS

Figure 1:
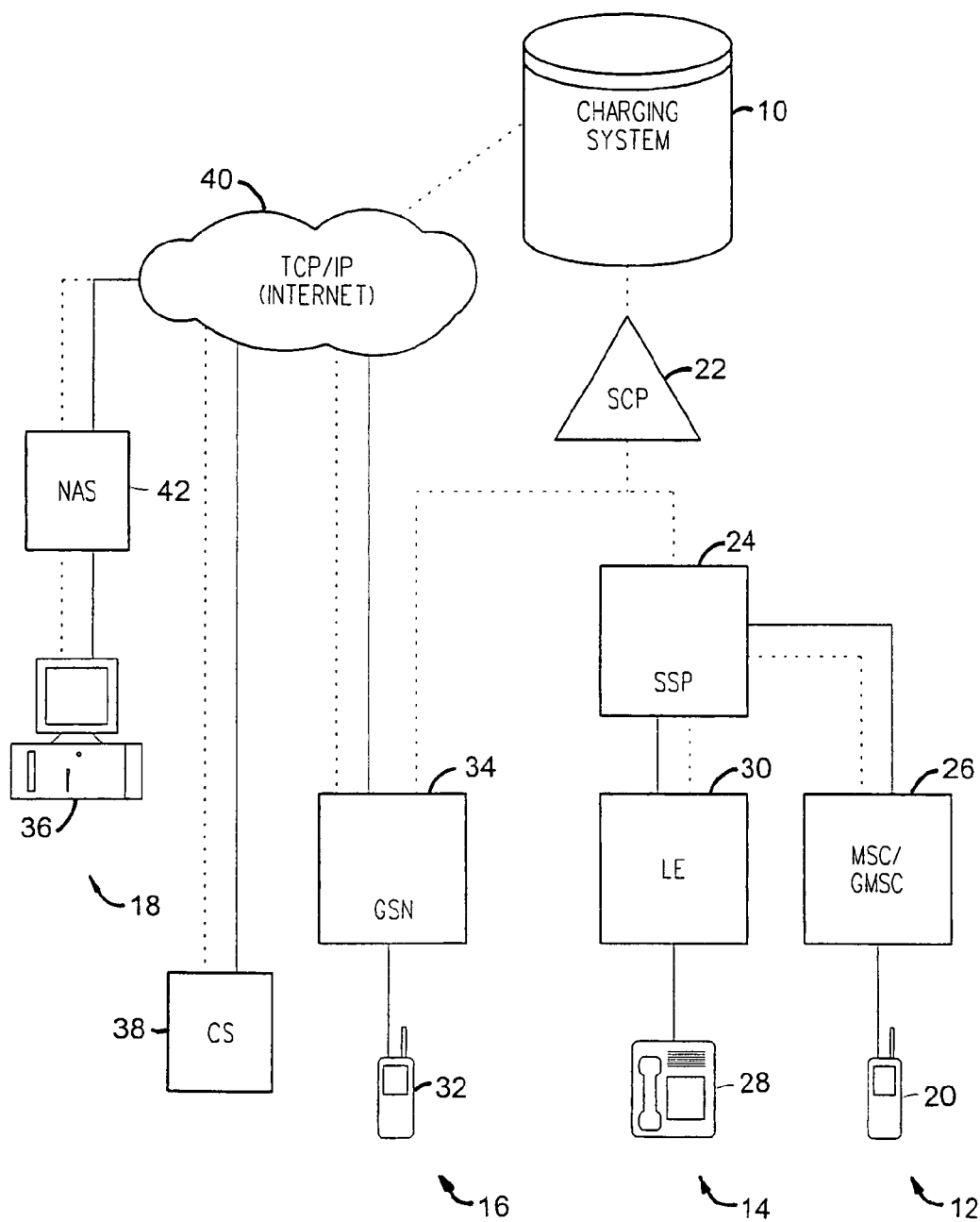
FIG. 1 shows an example of use of a charging system being interfaced to different communication environments for non-binding explanation of the operational context of the present invention.

In the following, the best mode of carrying out the invention as well as preferred embodiments thereof will be described through reference to the drawing. Here, insofar as different functionalities of the present invention are described, it should be clear that such functionality may be achieved either in hardware, in software, or through a combination thereof.

FIG. 1 shows an example of use of a charging apparatus or system being interfaced to different communication environments for non-binding explanation of the operational context of the present invention.

As shown in FIG. 1, according to the present invention a charging apparatus 10 may be interfaced to a plurality communication networks 12, 14, 16, 18. The charging system 10 shown in FIG. 1 is interfaced to a GSM mobile communications network 12, a public switched telecommunications network PSTN 14, a GPRS mobile communications network 16, and the Internet 18. Generally, the charging system 10 needs to access and monitor the subscribers of these communication networks 12, 14, 16, 18. Examples of different access methods are described next.

As shown in FIG. 1, when the charging apparatus 10 accesses a subscriber via a portable radio communication unit 20, then the invocation is performed via a service control point SCP 22 which is connected to a service switching point SSP 24. The service switching point SSP 24 is connected to a mobile switching center/gateway mobile services switching center MSC/GMSC 26 which support the portable radio communication unit 20.

It should be noted that the term portable radio communication unit which is referred hereinafter also as mobile phone includes all equipment such as pagers, communicators, i.e. electronic organizers, smart phones or the like. The mobile switching center/gateway mobile services switching center MSC/GMSC 26 provides specific data about individual mobile phones 20 and operates as an interface towards other networks such as an integrated services digital network ISDN, another public land mobile network PLMN, e.g., the GPRS mobile communications network 16, or the public switched telecommunications network PSTN 14.

As shown in FIG. 1, when the charging apparatus 10 applies cost control of a subscriber accessing service via a fixed telephone 28, then the invocation is performed via the service control point SCP 22 which is connected to the service switching point SSP 24. The service switching point is connected to a local exchange LE 30 which supports the fixed telephone 28.

As shown in FIG. 1, when the charging apparatus 10 applies cost control of a subscriber accessing service via a mobile phone 32 with GPRS capabilities, then the invocation is performed via the service control point SCP 22 which is connected to a gateway support node GSN 22.

As shown in FIG. 1, when the charging apparatus 10 applies cost control of a subscriber accessing service via a data terminal 36 which is communicating with a content server CS 38, then the invocation is performed via a TCP/IP Internet network 40 that is connected to a network access server NAS 42. A mobile phone (not shown) accessing the content server CS 38 on the Internet 40 would operate in the same way as the data terminal 36, except that the gateway support node GSN 34 would replace the network access server NAS 42.

Further, the present invention is, e.g., also applicable to flow based charging FBC according to 3GPP TS23.125, with real time charging and credit control over several services simultaneous for one account/subscriber, possibly measuring usage in several service types, also referred to as units types, even within one service. Here, a request for fund reservation from an end terminal side or a usage report could include all these services and measured service types which may then be used as outlined in the following description of the present invention.

Further, another example for application of the present invention is fund reservation in a real time charging environment where a request for fund reservation is received at the charging apparatus from an node for a single account/subscriber, e.g., via Diameter Credit Control DCC according to IETF RFC 4006. The request for fund reservation may be related to several services that in turn could be measured on one or several service types. These services and service types may have different fund reservation needs to start or continue the execution of the service, possibly with a relation between the components of the request. E.g., this relation could be that one service, e.g., e-mail could require that the bearer service also get a reservation allowed in order to execute. Other examples include a combined picture sharing and talk service where the service need to reserve unit types both for time, e.g., talk, and data volume, e.g., picture sharing, in order to be executed.

Further, another example for application of the present invention is fund reservation in a real time charging environment for FBC and the Internet Protocol Multimedia Sub-System IMS.

For flow based charging FBC the invention applies since the supervising/controlling node, which could be a "black box" on the Gi interface or an application in the GPRS gateway supporting node GGSN, reports the usage for all services for one user in one report. In this situation several services will compete for resources when the account is low. In other solutions there may be no requirement to report all usage in one report but when there are competition of the funds, e.g., a Diameter server, could ask for re-authorization of all funds and redistribute them over the services. This re-authorization mechanism applies to all Diameter users and thus to all scenarios where the Diameter server or in other words the charging apparatus wants to redistribute the available resources.

For the Internet Protocol Multimedia Sub-System IMS the situation is similar but in addition to be able to use several services simultaneously, several components might be involved in the execution of one service and might independently invoke the charging apparatus according to the present invention. The charging apparatus can identify the situation and know which invocations to expect before making any reservations or might correlate the reservations after waiting a moment, then make the reservation. Correlation is rather resource consuming which can make it better to approach the problem by handing out initial uncoordinated reservations and then using the Diameter feature for re-authorization and rearranging the funds if needed, as the Internet Protocol Multimedia Sub-System IMS is also using Diameter Charging Control DCC for real-time charging.

Further, another example for application of the present invention are multiple-user accounts, i.e. several users have access to one account value simultaneously. Even if Diameter Charging Control DCC was outlined above, there may other online protocols that support re-authorization.

Further, for the exchange of fund requests the charging environment may offer an access protocol that can handle all services/service types units in question with one fund request processing step, e.g. as in Diameter Credit Control DCC already outlined above, an access protocol that has the capability to coordinate the requests via sessions, e.g., according to Customised Applications for Mobile Networks Enhanced Logic CAMEL Application Part CAP, see 3GPP TS 29.078, and/or access protocols with uncoordinated services that need to be coordinated within the charging apparatus or before invocation of the fund reservation. By optimising the reservations for each service and service type the number of reservation requests and invocations of the charging apparatus will be minimized, as will be explained in detail in the following.

It should be noted that the different charging apparatus access scenarios and the further application scenarios outlined above are illustrative only and have no restricting effect on the scope of the present invention as explained in the following. Also, a detailed description of the communication networks 12, 14, 16, 18 is not provided here since their functions and components are known to the person skilled in the art.

Figure 2:
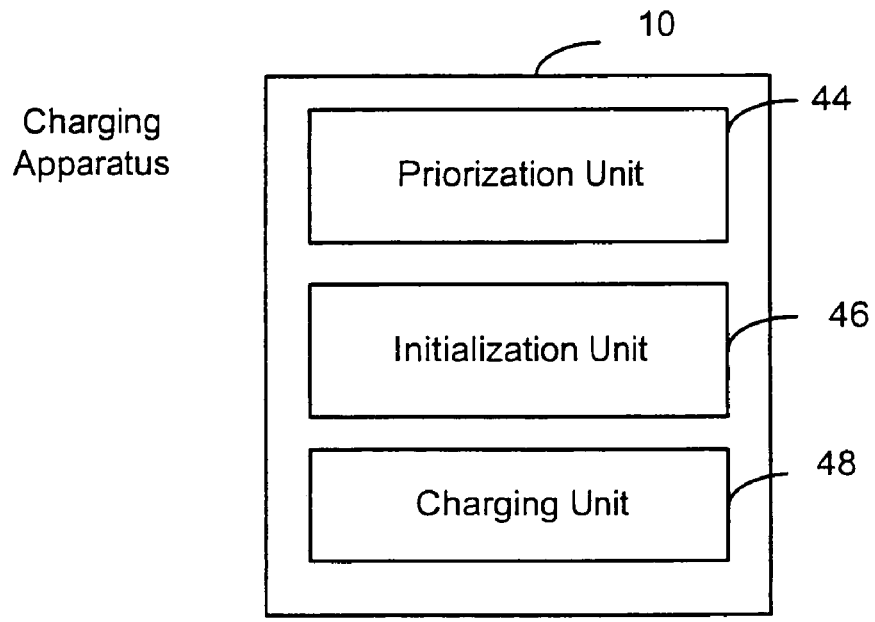
FIG. 2 shows a schematic diagram of the charging apparatus according to the present invention.

FIG. 2 shows a schematic diagram of the charging apparatus according to the present invention.

As shown in FIG. 2, the charging apparatus according to the present invention comprises a service prioritization unit 44, an initiation unit 46, and a charging unit 48. It should be noted that the service prioritization unit 44 and related operation may be optional.

Figure 3:
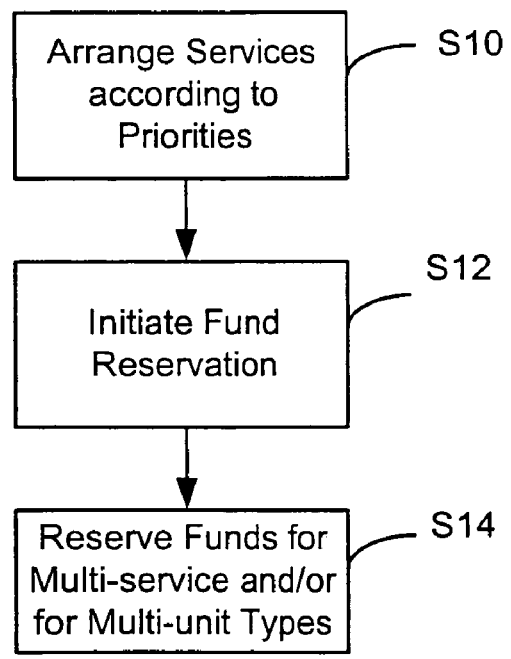
FIG. 3 shows a flowchart of operation for the charging unit shown in FIG. 2.

FIG. 3 shows a flowchart of operation for the charging unit shown in FIG. 2.

As shown in FIG. 3, operatively the service prioritization unit 44 executes a step S10 to arrange services before fund reservation according to a prerequisite succession for service delivery. Here, the prerequisite succession defines at least one pre-requisite service, if any, that needs to be provided prior to at least one higher succession invoking service. Further prerequisite succession defines at least one higher succession invoking service.

As shown in FIG. 3, operatively the initiation unit 44 executes a step S12 to initiate a fund reservation with respect to at least two services and/or at least two service types used for a single service. Here, the initiation unit 46 may execute the step S12 at a start of a charging session. As an alternative, the initiation unit 46 may execute the step S12 during an ongoing charging session for fund re-authorization with respect to different services and/or different service types.

As shown in FIG. 3, operatively the charging unit 46 executes a step S14 to reserve funds for service delivery to the at least two services and/or for the at least two service types such that deviations between predicted fund use-up times are minimized. Also, operatively the charging unit 46 will continuously interrogate whether a new request for fund reservation has been submitted to the charging apparatus 10 either at start of a charging session or during an ongoing charging session.

Figure 4:
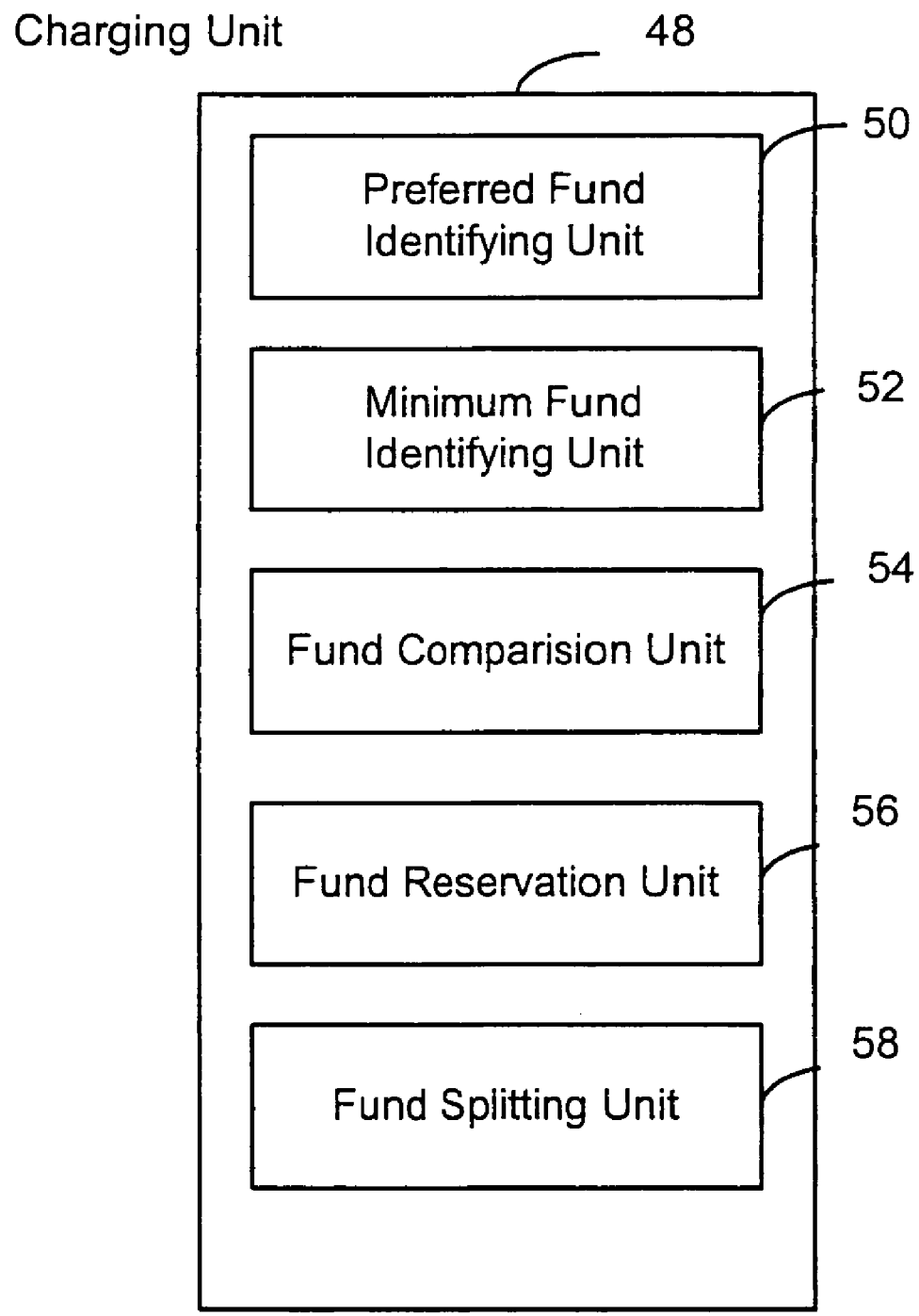
FIG. 4 shows a detailed diagram of the charging unit shown in FIG. 2.

FIG. 4 shows a detailed diagram of the charging unit shown in FIG. 2.

As shown in FIG. 4, the charging unit 48 comprises a preferred fund identifying unit 50, a minimum fund reservation unit 52, a fund comparison unit 54, a reservation unit 56, and a fund splitting unit 58.

Figure 5:
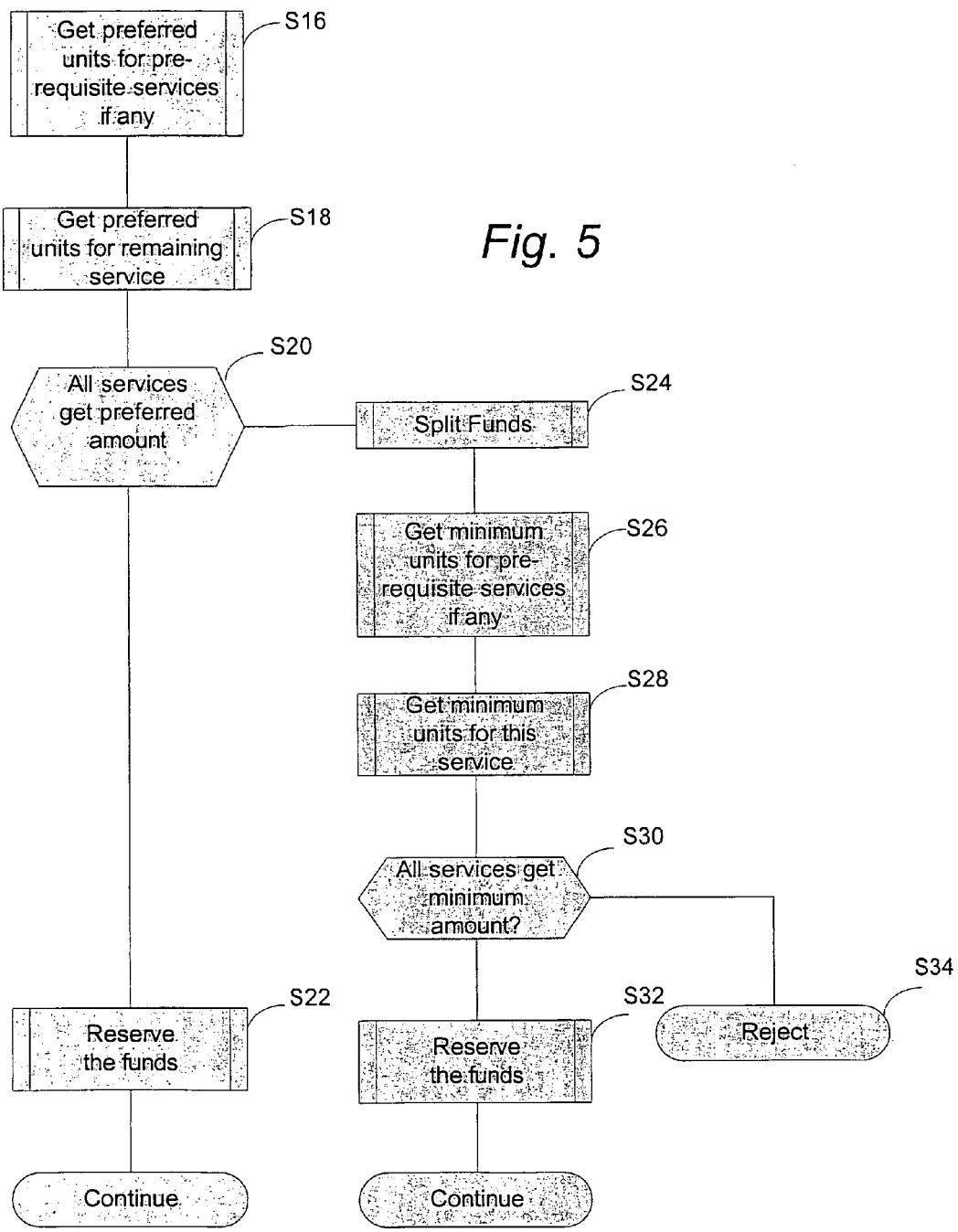
FIG. 5 shows a flowchart of operation for the charging unit shown in FIG. 4 at start of a charging session.

FIG. 5 shows a flowchart of operation for the charging unit shown in FIG. 4 at start of a charging session.

As shown in FIG. 5, operatively the preferred fund reservation unit 50 executes a step S16 to identify an amount of at least one first preferred fund for the at least one pre-requisite service, if any, in view pre-established knowledge on service characteristics of the at least one pre-requisite service. Also, operatively the preferred fund reservation unit 50 executes a step S18 to identify an amount of at least one second preferred fund for the at least one higher succession invoking service in view pre-established knowledge on service characteristics of the at least one higher succession invoking service.

As shown in FIG. 5, operatively the fund comparison unit 54 executes a step S20 to compare a sum of the amount of the at least one first preferred fund and the amount of the at least one second preferred fund against an overall available fund.

As shown in FIG. 5, operatively the fund reservation unit 56 executes a step S22 to reserve the at least one first preferred fund for the at least one pre-requisite service, if any, and to reserve at least one second preferred fund for the at least one higher succession invoking service when the sum of the amount of the at least one first preferred fund and the amount of the at least one second preferred fund is lower or equal than the overall available fund.

As shown in FIG. 5, operatively the fund splitting unit 58 executes a step S24 to split funds between at least one pre-requisite service, if any, and the at least one higher succession invoking service and according to related service type(s) using a pre-determined fund splitting optimisation when the sum of the amount of the at least one first preferred fund and the amount of the at least one second preferred fund is higher than an overall available fund.

As shown in FIG. 5, operatively the minimum fund identifying unit 52 executes a step S26 to identify an amount of at least one first minimum fund for the at least one pre-requisite service, if any, in view of pre-established knowledge on service characteristics of the at least one pre-requisite service. Also, operatively the minimum fund identifying unit 52 executes a step S28 to identify an amount of at least one second minimum fund for the at least one higher order invoking service in view pre-established knowledge on service characteristics of the at least one higher order invoking service;

As shown in FIG. 5, operatively the fund comparison unit 54 executes a step S30 to compare the amount of the at least one first minimum fund and the amount of the at least one second minimum fund against the generated fund splitting result.

As shown in FIG. 5, operatively the Fund reservation unit 56 will execute a step S32 to reserve the at least one first minimum fund for the at least one pre-requisite service, if any, and the step of reserving the at least one second minimum fund for the at least one higher succession invoking service when the generated fund splitting result covers the amount of the at least one first minimum fund and the amount of the at least one second minimum fund. Otherwise, the fund reservation unit 56 will execute a step S34 to reject the request for fund reservation.

Figure 6:
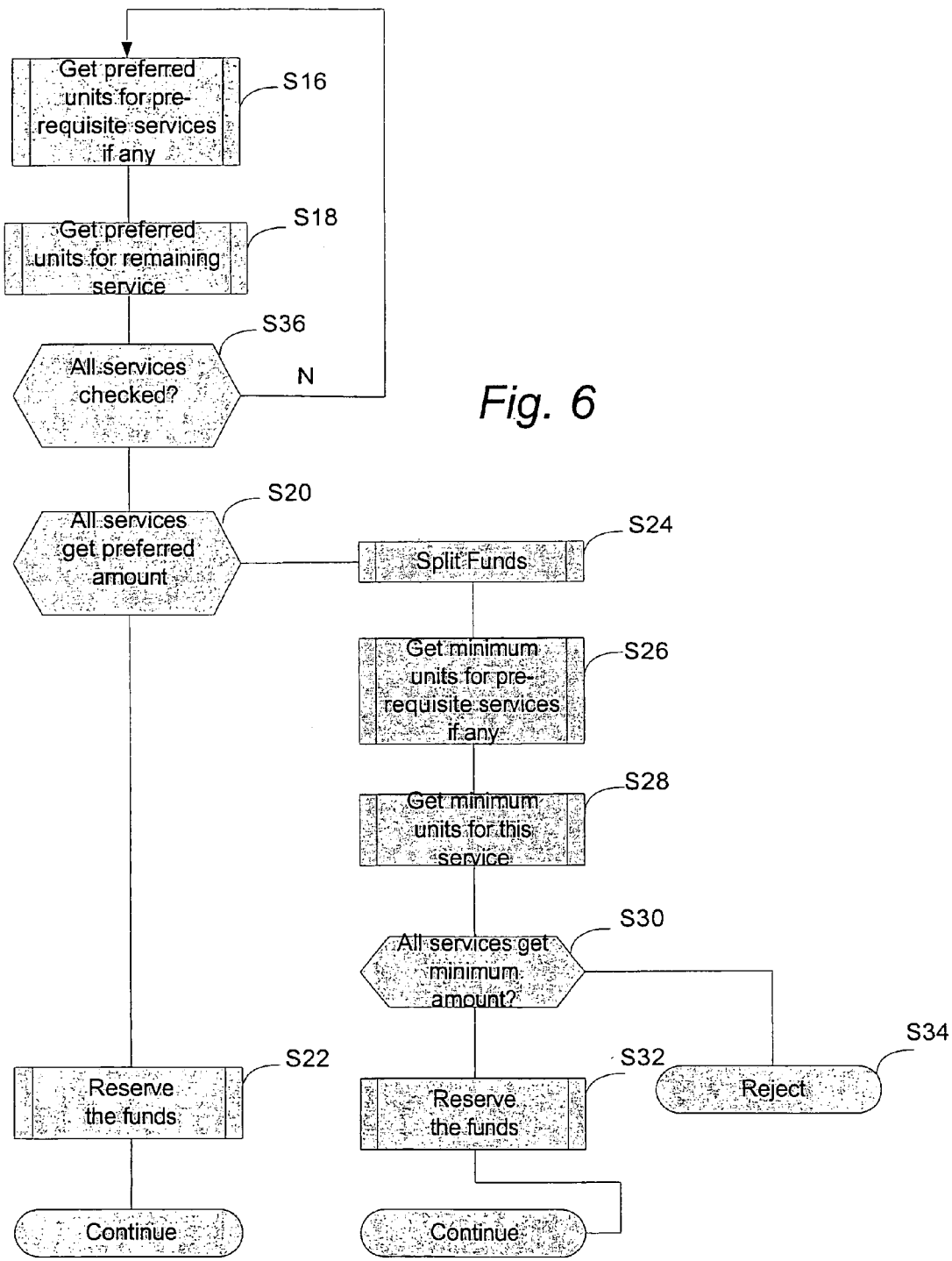
FIG. 6 shows a flowchart of operation for the charging unit shown in FIG. 4 at continuation of a charging session for fund re-authorization.

FIG. 6 shows a flowchart of operation for the charging unit shown in FIG. 4 at continuation of a charging session for fund re-authorization.

As shown in FIG. 6, operatively the initialization unit 46 of the charging apparatus shown in FIG. 2 will execute a sequence of steps S16, S18, S36 to support the reservation of all running services. Here, steps S16 and S18 are similar to those explained above with respect to FIG. 5 and related explanation will not be repeated here.

Further, step S36 is executed to check that all running services are considered and to loop back, if this should not be the case. It should be noted that all running services are walked through, not only the service(s) with highest priority. Also, it might be that running services are not a pre-requisite for each other.

An example being related to the execution of step S36 is RAR as an operation initiated by a DCC server to immediately ask its clients to report their service usage and return their granted funds so that the server can, e.g., redistribute the resources/funds and possibly send out new grant of funds to the clients. In such a situation the start of session scenario would be applicable.

Otherwise, a situation where this loop according to step S36 is important is, e.g., non-RAR, such as CAMEL where the charging server, e.g. a Service Control Point SCP, conventionally has to wait until the original condition, e.g., granted time or granted data volume, has been fulfilled/used up. However, according to the present invention all services, e.g., 64 services may be surveilled by flow based control FBC through a report in one operation. Of all services same may relate to each other, i.e. have a pre-requisite relation established, while other may be totally independent. The execution of step S36 and the related loop mechanism secures that all reported services are checked and not only a single service.

In conclusion, what is important to note with respect to step S36 is that for every reported services related pre-requisite service are checked. Funds are initially reserved for these pre-requisite services are reserved prior to fund reservation for the service under consideration.

Further, it may be that all reported services do not have a prerequisite service. Also then they must be checked according to step S36 prior to execution of step S20 since the funds should potentially be split among them afterwards.

Further, with respect to the explanations of FIGS. 5 and 6 it should be supplemented that in particular steps S24 to S28 may be iterated to avoid rejection of a fund reservation request at the start of a charging session or at fund reservation re-authorization.

While above aspects of fund splitting and pre-determined fund splitting optimisation have described in general, in the following examples of fund splitting algorithms will be explained in more detail.

A first option to operate the fund splitting unit 58, to execute step S24 shown in FIG. 5, is to use pre-registered information on the amount of preferred funds and minimum funds with respect to each involved service and related service type (s).

A second option to operate the fund splitting unit 58, to execute step S24 shown in FIG. 5, is to consider a plurality of pre-known combinations of services and related service type(s) and to use information on the amount of preferred funds and minimum funds with respect to all involved service and related service type(s).

A third option to operate the fund splitting unit 58, to execute step S24 shown in FIG. 5, is to execute the pre-determined fund splitting optimisation in an adaptive manner on the basis of historical use data reflecting prior usage with respect to each involved service and related service type (s).

Here, a first way to realize the third option is that the historical use of each service and related service type(s) is analysed against the historical use of each other service and related service type(s) for balanced fund reservation adaptation.

Heretofore, in the adaptive solution the usage of the previous reservation is feed back to the reservation process. A typical fund splitting algorithm that depends on the historical data is as follows:

```
UsageChange:= Cost used by A/Cost assigned to A last – Cost
used by B/Cost assigned to B last;
// Inititial values could be fetched from service data.
if (UsageChange > 0.1) {
    %-age for A:= ROUND_UP(1+UsageChange)*%-age for A last;
    %-age for B:=100 – %-age for A;
}
Else if (Usage Change<–0.1) {
    %-age for B:= ROUND_UP(1+UsageChange)*%-age for B last;
    %-age for A:=100 – %-age for B;
}
/* Else keep split factor */
```

This fund splitting algorithm uses a hysteresis function that regulates only if the fault in the last prediction is more than 10%. If it is, it will try to even the amount split between the two different services in a quick adaptation. If less amplification is wanted a constant could be introduced to reduce the speed of change.

It should be noted that this fund splitting algorithm could be used within the services as well. Also, more complex fund splitting algorithms that look forward and adapt to future rate changes are possible to further increase the prediction exactness.

Further, in the above example the %-age for each service has to be applied to the remaining units and there has to be a check if the remaining fund will provide the minimum amount of units that a service requests to be able to execute.

Further steps, if the minimum amount is not provided, include to exclude the lowest prioritized services that is not prerequisite for services with higher priority and to distribute the %-age or funds for these services to the other services. The minimum amounts are rechecked and possibly more services are to be excluded.

While above a first way to realize the third option of fund splitting has been described, a second way to realize the third option of fund splitting is to consider a service combination or a plurality of service combinations on the basis of historical use data reflecting prior usage of the service combination or the plurality of service combinations.

A fund splitting algorithm for the second way to realize the third option of fund splitting is as follows:

$$UsedAverage_j := (SUM\_from\_i=1\_to\_n\ [(Used_{i,j}/Grant_{i,j}))/n];$$
$$IF\_any\_i\ [UNSIGNED(UsedAverage_j - Used_{i,j}/Grant_{i,j}) > 0.1];$$
$$\{$$
$$\quad FOR\_all\_I$$
$$\quad\quad [TGrant_{i,j+1} := TotalGrant_{i,j+1} * Grant_{i,j}/TotalGrant_j];$$
$$\quad FOR\_all\_I$$
$$\quad\quad [Grant_{i,j+1} :=$$
$$\quad\quad\quad (1 + (Used_{i,j}/Grant_{i,j}\ UsedAverage_j))*TGrant_{i,j+1}];$$
$$\}$$

Therefore, first the average percentage of usage of the granted funds is calculated. If the difference is more than 10% between the average usage and the individual usage a re-calculation is made of the split. Note that "i" indicates the service identity which means that the IF statement measures if any service usage differs from the average usage of reservations with more than 10% during the last time interval, j being the used reservation and j+1 means the next reservation. $Used_{i,j}$ means usage for service "i" during the last used reservation interval.

Then, if the difference exceeds 10%, in a second step follows the recalculation a temporary granted fund by using the split in the last interval and the available units from the new interval. The fund usage of the old interval is used to correct the new intervals fund grant by adapting to how much of the last reservation that was used. If all is used more will be granted.

Further, the division could also be adapted to reflect historical trends by looking at earlier reservations:

$$Grant_{i,j+1} := TGrant_{i,j+1} *$$
$$[1+(Used_{i,j}/Grant_{i,j} - UsedAverage_j)*$$
$$Constant_j$$
$$+(Used_{i,j-1}/Grant_{i,j-1} - UsedAverage_{j-1})*$$
$$Constant_{j-1}$$
$$\ldots$$

From the above it should be clear that, firstly, the recalculation of a temporary grant is calculated-according to the split in the last interval but with the available funds for the new interval. The service usage of the old intervals are considered to correct the new intervals grant by adapting to how much of the last reservation that was used compared to the average usage by all services in that interval. Further, a constant is applied to weight the importance of each old interval. An alternative representation to the above might be Granti,j+1:=TGranti,j+(1+SUM((Usedi,j/Granti,j–UsedAveragej)*Constantj), where j starts at x, stops at y and is decreased with one at each summary iteration.

Here the change of each old interval is included and weighted with a constant in order to reflect its importance. Also in this case later checks have to be made for minimum amounts and that the sum of all fund grants equals the total grant.

Further, the mentioned fund splitting algorithms explained above are only examples of what could be done within adaptive charging process regulation. They only show service usage but could also be used within a service to divide between different service or unit types since the requirement is still the same: optimise the division of available funds between the involved unit types.

Further, if historical data is used for adaptive fund splitting, the new result of fund splitting is used update the usage data information with the latest usage information.

Further, an alternative solution for fund splitting on the algorithmic level is to assign the minimum amount of units and accept the increased number of reservation requests.

Further, yet another alternative solution is to consider historical usage of different service combinations and to analyse the historical usage of each service combination against the historical use of each other service combination for balanced fund reservation adaptation between different service combinations. This allows to avoid the one service combination receiving all funds blocks all other service combinations from receiving funds.

While above fund splitting algorithms have been explained, in the following the consideration of charging optimisation during multi-service and/or multi-type service rating according to the present invention will be described.

In other words this embodiment of the present invention relates to yet another option to execute step S24 shown in FIG. 5 or 6, however not in the charging apparatus 10 described so far, but in a rating engine that may be operated separately from the charging apparatus 10. In more detail, according to the present invention it is also suggested to use a splitting mechanism integrated into a rating service activated by the charging apparatus 10.

Figure 7:
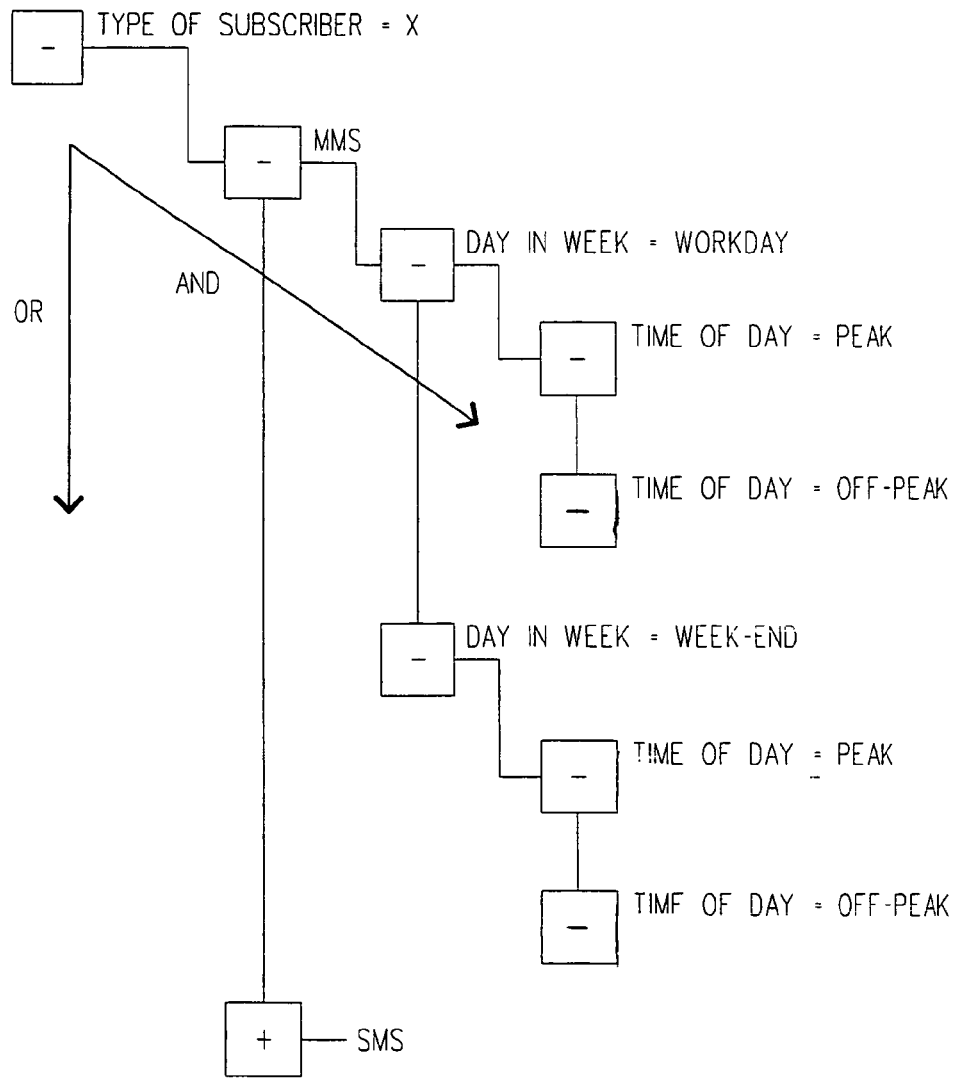
FIG. 7 shows an example of a rating tree and related selection logic used in a rating service.

FIG. 7 shows a general example of a rating tree and related selection logic used in a rating service.

As shown in FIG. 7, conventionally a rating tree has branch ends with one cost, e.g., rate or fee that make up the price.

As shown in FIG. 7, the rating tree models various conditions in a decision structure that can be used for a charging process to determine the rate to charge a particular type of subscribers shown as "X" that use or used a multimedia messaging service MMS service on a particular day and at a particular time.

As an example, the operator may want to offer a special rate on off-peak week-end usage of the multimedia messaging service MMS service to one or more of these subscribers of a specific type referred to as type of subscriber X in FIG. 7. Then, the operator creates a new service class specifically for type of subscriber X which has a corresponding decision structure in the rating tree to account for the special rate on off-peak week-end usage of the multimedia messaging service MMS service.

Figure 8:
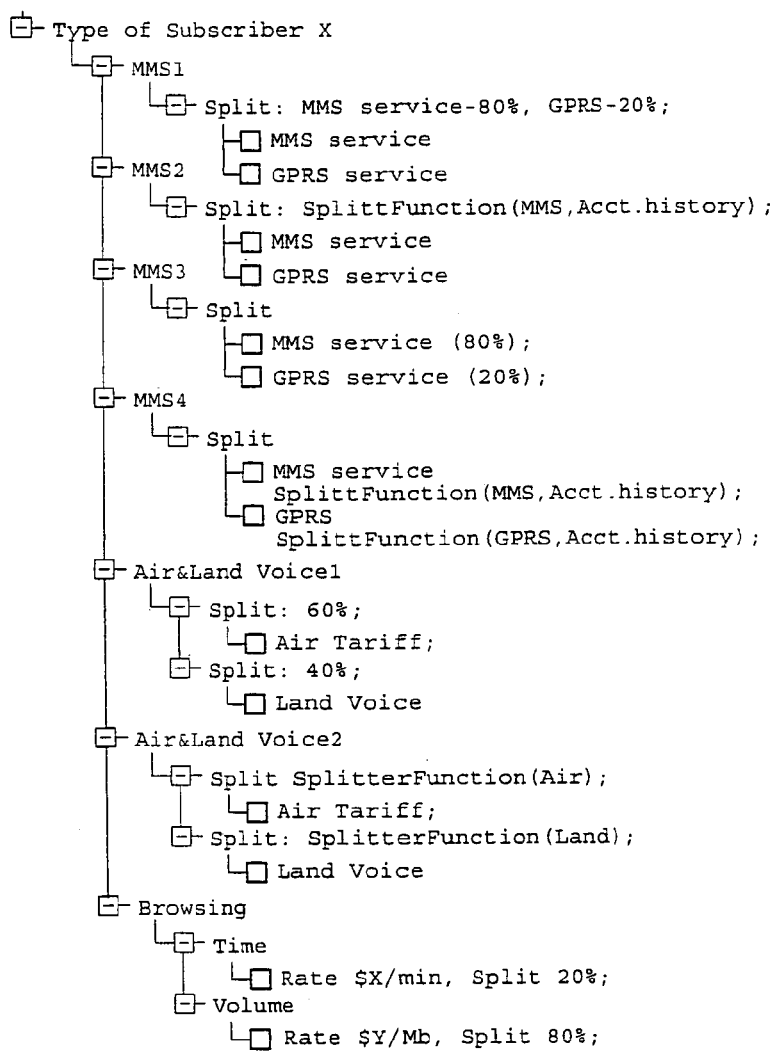
FIG. 8 shows a rating tree and related selection logic according to the present invention allowing for an integration of a splitting mechanism into the rating service.

FIG. 8 shows an a rating tree and related selection logic according to the present invention allowing for an integration of a splitting mechanism into the rating service.

As shown in FIG. 8, according to the present invention it is suggested to incorporate conditions and so-called modifiers into the rating tree with respect to different chargeable events.

As shown in FIG. 8, with respect to MMS1 and MMS2, a first option is to introduce a modifier node into the rating tree, which modifier node is not the last in the rating tree. The modifier node splits the amount before leave nodes are reached and therefore will split an available charging value on a per leaf node or on a per leaf node set basis. Further, the modifier node may be realized using parameter values, e.g., percentage values, see MMS1, or through a functional call, e.g., SplitterFunction(MMS, GPRS, Acct.history), see MMS2. Here, Acct.history is short for account history and may be interpreted as previous knowledge of either MMS usage or knowledge of the combined usage of MMS and GPRS.

As shown in FIG. 8, with respect to MMS3, a second option is to allow for an extra optional parameter in leaf nodes of the rating tree defining the part of the total amount to be spent on one service in relation to another service.

As shown in FIG. 8, with respect to MMS4, a third option is to allow for an extra modifier node as functional call in the leaf node, e.g., SplittFunction(MMS, Acct.history, GPRS, Acct.history), which gives an absolute value without relation to other services.

Further to the above, the function call may state competing services and the one that is to be assigned funds. This could of course be implicit by the system having a common area, e.g. the account data, that states all ongoing services and this common area provides the information.

As shown in FIG. 8, additional examples of fund splitting may be related on Air & Land Voice, and rely on the same principles as outlined above. Also, different services may be rated according to different service types, e.g., $ X per time unit or $ Y per data volume in combination with any of the modifier nodes outlined above. It may be understood that in this case and for this kind of operator the cost for air time is always combined with the time for land cost.

It should be noted that the functions being used for splitting may be based on several parameters, e.g., history for last reservation in this session, history for a pre-specified number of last reservations, current traffic profile in the system/area/cell, history on this system/area/cell, current traffic profile for this service class/account class, history on this service class/account class, subscriber/account history/profile, fixed rating logic, fixed service class/account class/subscriber. Also, while this preferred embodiment of the present invention has been explained with respect to a rating tree, a similar splitting could be done on the basis of any general decision tree, pre-processing tree, etc.

Figure 9:
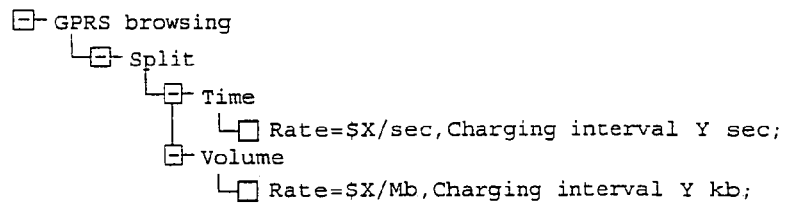
FIG. 9 shows a rating tree and related selection logic according to the present invention allowing for a combined charging in the rating service.

FIG. 9 shows a rating tree and related selection logic according to the present invention allowing for a combined charging in the rating service.

Here, according to the present invention it is proposed to do iterations for combined charging.

As shown in FIG. 9, if every service is defined to have a rate/unit, e.g., time per money or data volume per money, and also a smallest charging interval per service, e.g., 30 sec or 1 kb, then an iteration could be done between the services. One such example would be to start with the time based service, to continue with the data service if funds remain after rating the time based service, return to the time based service for another charging interval, etc.

As shown in FIG. 9, the node split handles the slitting logic during iteration. It is the function defined in the splitter node that achieves an iteration between time and data volume functions by having each service rate one charging interval that will be added to the total cost until the available charging amount is used up.

In conclusion, the preferred embodiment of the present invention as explained with respect to FIG. 8 and FIG. 9 allows for a split of available charging amounts in the rating service, before invoking a rating for a specific service or at the time of invoking a rating for a specific service. The rating service divides an available charging amount between different services and/or service types that are run due to a same event, in particular when an available charging amount is not enough to satisfy a request for service funds. It should be mentioned that this approach is not only applicable to real-time charging, but also for pre-paid or post-paid service subscriptions.

While above the present invention has been explained with respect to optimised multi-service and/or multi-type charging, in the following different aspect of inter-operation between the optimised multi-service and/or multi-type charging and usage measurement will be explained.

Figure 10:
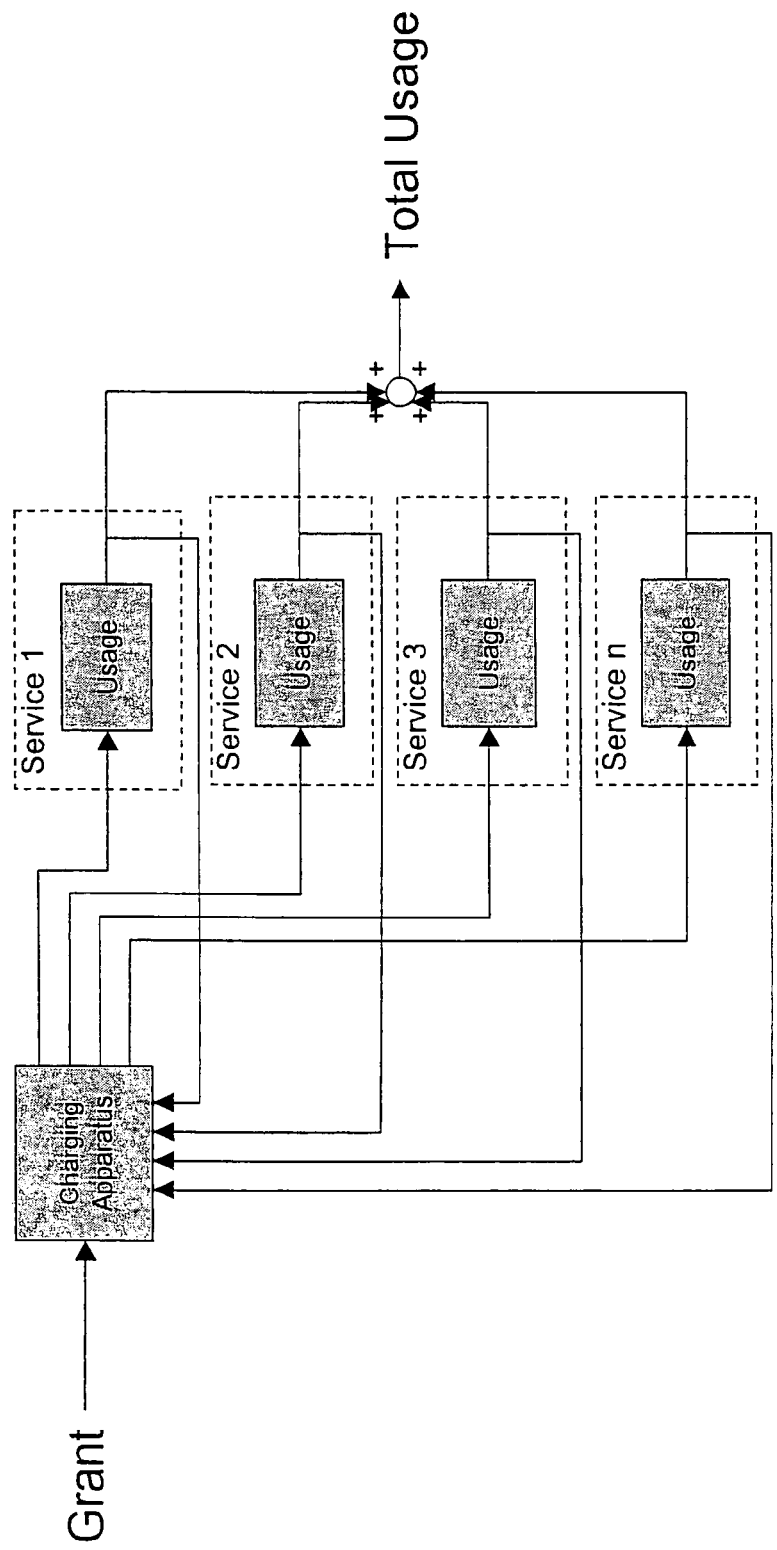
FIG. 10 shows a first option for service usage feedback according to the present invention.

FIG. 10 shows a first option for service usage feedback according to the present invention.

Generally usage describes the usage process for an individual service and related service type. Examples for service type may be time, events like SMS or MMS, money, total data volume, uplink data volume, downlink data volume, etc. It should be noted that the optimized charging and related usage measurement is not restricted to a particular service/unit type, and that a conversion between different service types allows to operate the charging apparatus on the basis of one single service type, e.g., available charging values in terms of money.

In view of the above, the grant can be any unit type, e.g., volume if the account stores volume. In the normal case the account stores money but the usage is normally not money, rather it is time or volume or both. In the later case the money needs to be converted from money to the used unit type. Here, the charging apparatus 10 could do the conversion or the individual service could do it. This conversion would be the rating.

As shown in FIG. 10, a first option for service usage feedback is that all fund splitting functionality outlined above is integrated into the charging apparatus 10. Service usage is fed back to the charging apparatus 10 according to any service type or according to a common service type selected for operation if the charging apparatus 10, e.g., money. The charging apparatus also knows the granted funds for each service for comparison with the fed back service usage.

Figure 11:
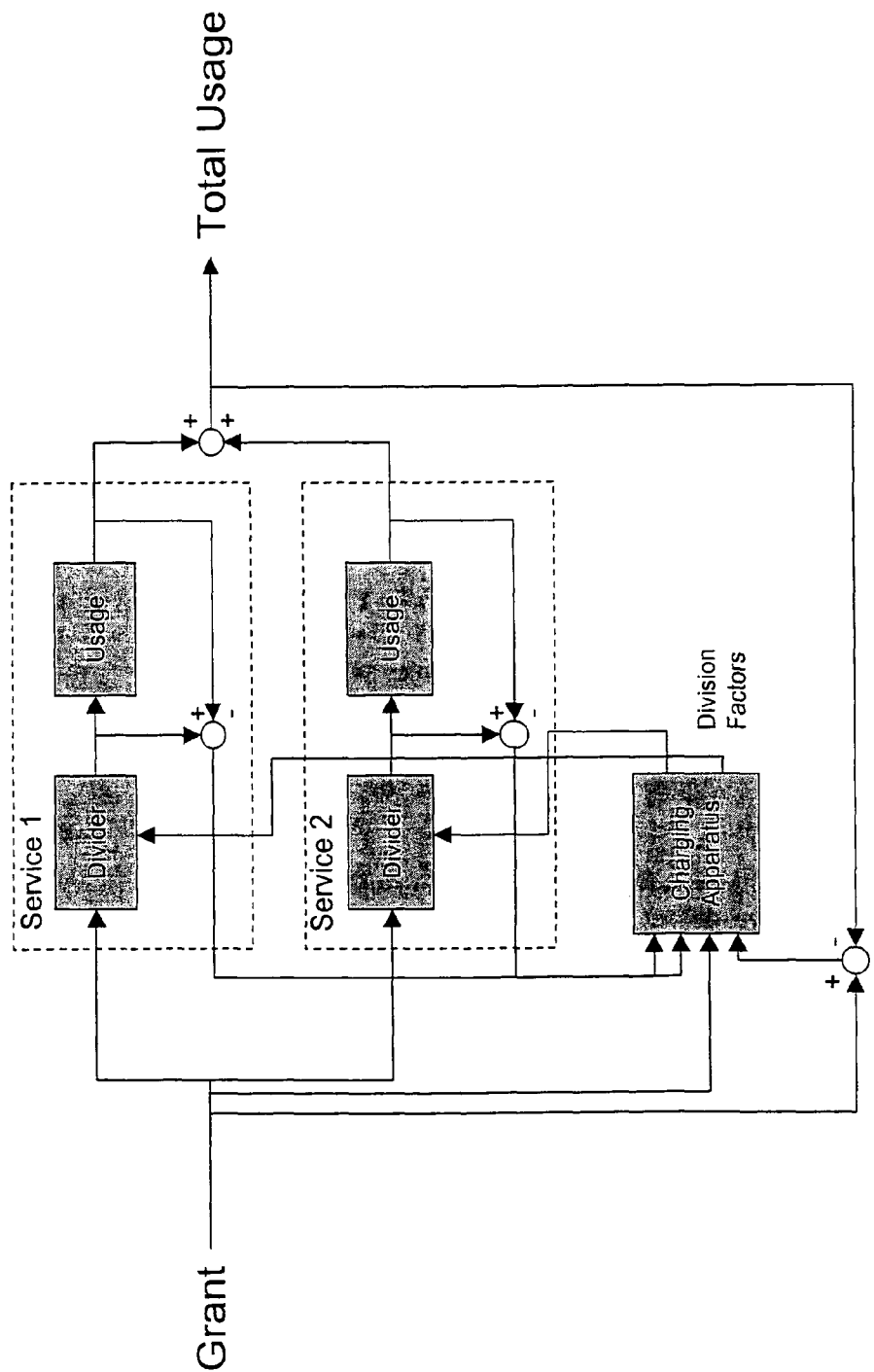
FIG. 11 shows a second option for service usage feedback according to the present invention.

FIG. 11 shows a second option for service usage feedback according to the present invention, particularly suitable for services which are handled in an outer feedback loop with respect to total service usage and total service grant.

As shown in FIG. 11, a second option for service usage feedback and related service rating is that part of fund splitting functionality outlined above is implemented locally with respect to different services. The rating related conversion could be executed either in the divider or the usage measurement unit. In should be noted that when the conversion is executed by the divider then the charging apparatus 10 needs to execute the conversion/rating and at the same time understand the feedback.

As shown in FIG. 11, a deviation between funds reserved for each service and funds actually used by each service and related service units over a charging interval is determined locally and then fed back to the charging apparatus 10 according to any service type or according to a common service type selected for operation if the charging apparatus 10, e.g., money. It should be noted that the charging apparatus 10 has knowledge of the division factor(s) and total grant.

Figure 12:
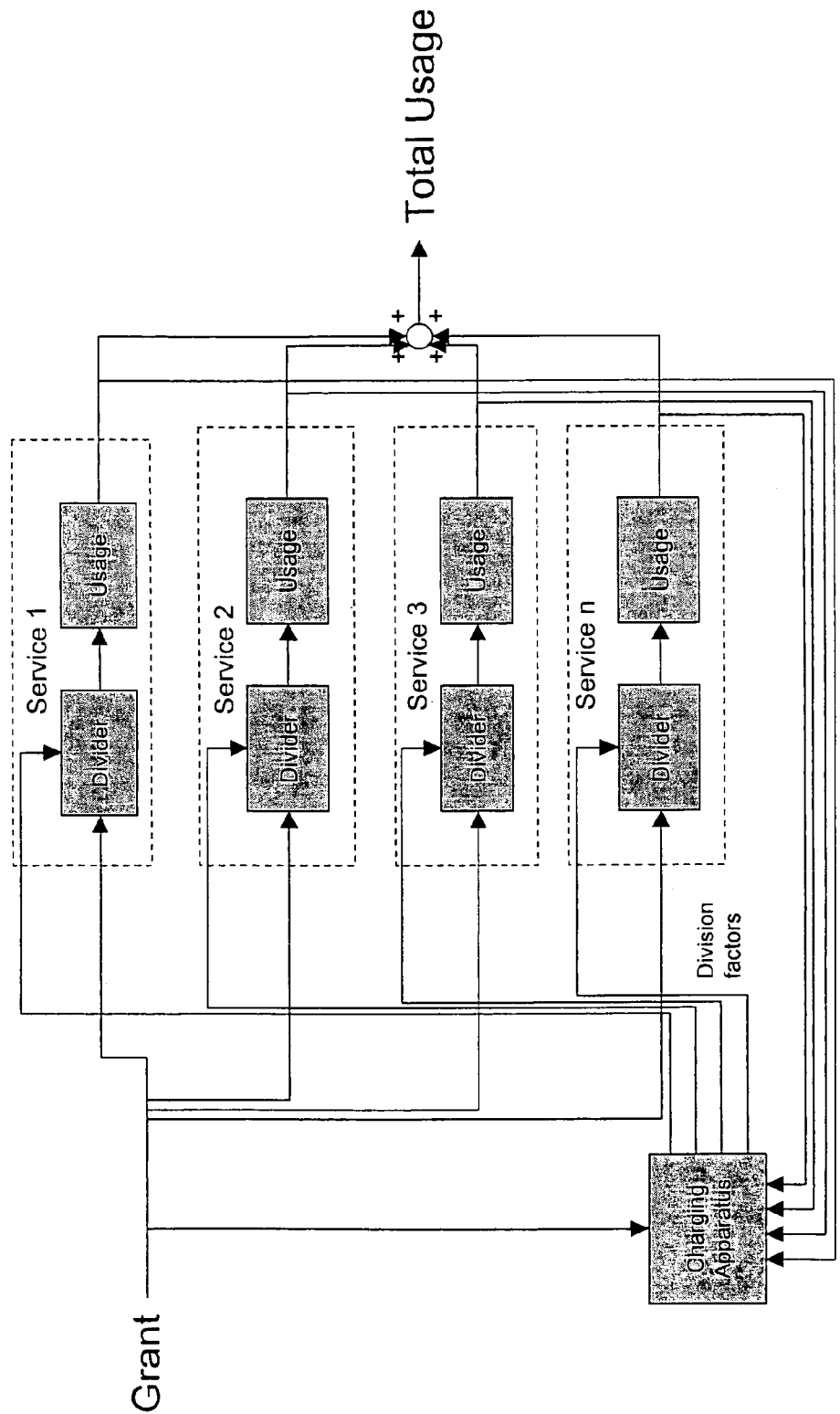
FIG. 12 shows a third option for service usage feedback according to the present invention.

FIG. 12 shows a third option for service usage feedback and related rating according to the present invention.

As shown in FIG. 12, a third option for service usage feedback is that each service receives the overall grant of charging amount. The charging apparatus sets a dividing factor which is then processed with respect to each service. Service usage is fed back to the charging apparatus 10 according to any service type or according to a common service type selected for operation if the charging apparatus 10, e.g., money.

| List of abbreviations: | |
|---|---|
| CDR | Call Data Record |
| CS | Content Server |
| EoCN | End of Call Notification |
| FBC | Flow Based Charging |
| GMSC | Gateway Mobile Services Switching Centre |
| GPRS | General Package Radio Services |
| GSM | Global System for Mobile Communications |
| GUI | Graphical User Interface |
| IMS | Internet protocol Multimedia Sub system |
| ISDN | Integrated Services Digital Network |
| LE | Local Exchange |
| MMS | Multimedia Messaging Service |
| MSC | Mobile Services Switching Centre |
| NAS | Network Access Server |
| PLMN | Public Land Mobile Network |
| PSTN | Public Switched Telecommunications Networks |
| SDP | Service Data Point |
| SMS | Short Message Service |
| SSF | Service Switching Function |
| SSP | Service Switching Point |
| TCP/IP | Transmission Control Protocol/Internet Protocol |
| USSD | Unstructured Supplementary Service Data |

The invention claimed is:

1. Method of executing a real-time charging session in a charging system being interfaced to at least one communication network, comprising the steps:

initiating, using a processor, a fund reservation with respect to at least two service types used for a single service; and reserving, using the processor, funds for service delivery to the at least two service types in parallel using a predetermined fund splitting optimization to minimize deviations between time of predicted fund depletion for the at least two service types, wherein the predetermined fund spitting optimization is executed using preregistered information on the amount of preferred funds and minimum funds with respect to each involved service and related service types, or the predetermined fund splitting optimization is executed with respect to a pre-known combination of services and related service types and uses a splitting mechanism integrated into a rating service activated by the charging system, or the predetermined fund splitting optimization is executed in an adaptive manner on the basis of historical use data reflecting prior usage with respect to each involved service and related service types.

2. Method according to claim 1, wherein it further comprises the step of arranging, using the processor, services before fund reservation according to a prerequisite succession for service delivery, wherein the prerequisite succession defines at least one pre-requisite service that needs to be provided prior to at least one higher order invoking service, and further at least one higher order invoking service.

3. Method according to claim 2, wherein the reserving of funds comprises the steps:

identifying, using the processor, an amount of at least one first preferred fund for the at least one pre-requisite service in view pre-established knowledge on service characteristics of the at least one prerequisite service;

identifying, using the processor, an amount of at least one second preferred fund for the at least one higher succession invoking service in view pre-established knowledge on service characteristics of the at least one higher succession invoking service; and comparing, using the processor, a sum of the amount of the at least one first preferred fund and the amount of the at least one second preferred fund against an overall available fund.

4. Method according to claim 3, wherein it comprises the step of reserving, using the processor, the first preferred funds for the at least one pre-requisite service and the at least one higher succession invoking service when the sum of the amount of the at least one first preferred fund and the amount of the at least one second preferred fund is lower or equal than the overall available fund.

5. Method according to claim 3, wherein it further comprises the step of splitting, using the processor, funds between at least one pre-requisite service and the at least one higher succession invoking service and according to related service types using the pre-determined fund splitting optimisation when the sum of the amount of the at least one first preferred fund and the amount of the at least one second preferred fund is higher than an overall available fund.

6. Method according to claim 5, wherein it comprises the steps:
identifying, using the processor, an amount of at least one first minimum fund for the at least one pre-requisite service in view of pre-established knowledge on service characteristics of the at least one pre-requisite service;
identifying, using the processor, an amount of at least one second minimum fund for the at least one higher order invoking service in view pre-established knowledge on service characteristics of the at least one higher order invoking service; and
comparing, using the processor, the amount of the at least one first minimum fund and the amount of the at least one second minimum fund against the generated fund splitting result.

7. Method according to claim 6, wherein it comprises the step of reserving the at least one first minimum fund for the at least one pre-requisite service and the step of reserving, using the processor, the at least one second minimum fund for the at least one higher succession invoking service when the generated fund splitting result covers the amount of the at least one first minimum fund and the amount of the at least one second minimum fund.

8. Method according to claim 7, wherein it comprises a step of rejecting, using the processor, the request for fund reservation when the generated fund splitting result does not cover the amount of the at least one first minimum fund and the amount of the least one second minimum fund.

9. Method according to claim 5, wherein the initiation of fund reservation is executed at a start of a charging session and the step of reserving, using the processor, funds is executed with respect to least two service types as identified in a fund reservation request submitted to the charging system.

10. Method according to claim 5, wherein the initiation of fund reservation is executed during an ongoing charging session for fund re-authorization and the step of reserving, using the processor, funds is executed with respect to at least two service types.

11. Method according to claim 9, wherein the pre-determined fund splitting optimisation is executed with respect to a plurality of pre-known combinations of services and related service types and uses information on the amount of preferred funds and minimum funds with respect to all involved service and related service types.

12. Method according to claim 1, wherein the historical use of each service and related service types is analysed against the historical use of each other service and related service types for balanced fund reservation adaptation.

13. Method according to claim 1, wherein it is executed with respect to a service combination or a plurality of service combinations on the basis of historical use data reflecting prior usage of the service combination or a plurality of service combinations.

14. Method according to claim 13, wherein historical usage of each service combination is analysed against the historical use of each other service combination for balanced fund reservation adaptation between different service combinations.

15. Charging apparatus being interfaced to at least one communication network for executing a real-time charging session, comprising:
an initiation unit adapted to initiate, using a processor, a fund reservation with respect to at least two service types used for a single service;
a charging unit adapted to reserve, using a processor, funds for service delivery to the at least two service types in parallel using a predetermined fund splitting optimization to minimize deviations between time of predicted fund depletion for the at least two service types, wherein the charging unit comprises a splitting unit adapted to
execute, using a processor, the predetermined fund splitting optimization using pre-registered information on the amount of preferred funds and minimum funds with respect to each involved service and related service types, or
execute, using a processor, the predetermined fund splitting optimization with respect to a pre-known combination of services and related service types and to use a splitting mechanism integrated into a rating service activated by the charging apparatus, or
executing, using a processor, the predetermined fund splitting optimization in an adaptive manner on the basis of historical use data reflecting prior usage with respect to each involved service and related service types.

16. Charging apparatus according to claim 15, wherein it further comprises a service prioritization unit adapted to arrange, using a processor, services before fund reservation according to a prerequisite succession for service delivery, wherein the prerequisite succession defines at least one pre-requisite service that needs to be provided prior to at least one higher order invoking service, and further at least one higher order invoking service.

17. Charging apparatus according to claim 16, wherein the charging unit comprises:
a preferred fund identifying unit adapted to identify, using a processor, an amount of at least one first preferred fund for the at least one prerequisite service in view pre-established knowledge on service characteristics of the at least one pre-requisite service; and to identify an amount of at least one second preferred fund for the at least one higher succession invoking service in view pre-established knowledge on service characteristics of the at least one higher succession invoking service; and
a fund comparison unit adapted to compare, using a processor, a sum of the amount of the at least one first preferred fund and the amount of the at least one second preferred fund against an overall available fund.

18. Charging apparatus according to claim 17, wherein the charging unit comprises a reservation unit adapted to reserve, using a processor, the at least one first preferred fund for the at least one pre-requisite service and the one second preferred fund for the at least one higher succession invoking service when the sum of the amount of the at least one first preferred fund and the amount of the at least one second preferred fund is lower or equal than the overall available fund.

19. Charging apparatus according to claim 18, wherein the charging unit comprises a splitting unit adapted to split, using a processor, funds between at least one prerequisite service and the at least one higher succession invoking service and according to related service types by executing a pre-determined fund splitting optimisation when the sum of the amount of the at least one first preferred fund and the amount of the at least one second preferred fund is higher than an overall available fund.

20. Charging apparatus according to claim 19, wherein the charging unit comprises:
   a minimum fund identifying unit adapted to identify, using a processor, an amount of at least one first minimum fund for the at least one prerequisite service in view of pre-established knowledge on service characteristics of the at least one pre-requisite service; and to identify an amount of at least one second minimum fund for the at least one higher order invoking service in view pre-established knowledge on service characteristics of the at least one higher order invoking service; wherein the fund comparison unit is adapted to compare, using a processor, the amount of the at least one first minimum fund and the amount of the at least one second minimum fund against the generated fund splitting result.

21. Charging apparatus according to claim 20, wherein the reservation unit is adapted to reserve, using a processor, the at least one first minimum fund for the at least one pre-requisite service and to reserve, using a processor, the at least one second minimum fund for the at least one higher succession invoking service when the generated fund splitting result covers the amount of the at least one first minimum fund and the amount of the at least one second minimum fund.

22. Charging apparatus according to claim 21, wherein the reservation unit is adapted to reject, using a processor, the request for fund reservation when the generated fund splitting result does not cover the amount of the at least one first minimum fund and the amount of the at least one second minimum fund.

23. Charging apparatus according to claim 19, wherein the initiation unit is adapted to initiate, using a processor, fund reservation at a start of a charging session and that the charging unit is adapted to reserve, using a processor, of funds with respect to at least two service types as identified in a fund reservation request submitted to the charging apparatus.

24. Charging apparatus according to claim 19, wherein the initiation unit is adapted to initiate, using a processor, fund reservation during an ongoing charging session for fund re-authorization and that the charging unit is adapted to reserve, using a processor, funds with respect to at least two service types.

25. Charging apparatus according to claim 23, wherein the splitting unit is adapted to execute, using a processor, the pre-determined fund splitting optimisation with respect to a plurality of pre-known combinations of services and related service types and to use information on the amount of preferred funds and minimum funds with respect to all involved service and related service types.

26. Charging apparatus according to claim 15, wherein the splitting unit is adapted to analyse, using a processor, the historical use of each service and related service types against the historical use of each other service and related service types for balanced fund reservation adaptation.

27. Charging apparatus according to claim 15, wherein the splitting unit is adapted to operate, using a processor, with respect to a service combination or a plurality of service combinations on the basis of historical use data reflecting prior usage of the service combination or a plurality of service combinations.

28. Charging apparatus according to claim 27, wherein the splitting unit is adapted to analyse, using a processor, historical usage of each service combination against the historical use of each other service combination for balanced fund reservation adaptation between different service combinations.

* * * * *